United States Patent [19]
Satoh

[11] Patent Number: 5,457,584
[45] Date of Patent: Oct. 10, 1995

[54] ROTARY HEAD TYPE RECORDING AND REPRODUCING APPARATUS

[75] Inventor: Keiji Satoh, Tokyo, Japan

[73] Assignee: Canon Kabushiki Kaisha, Tokyo, Japan

[21] Appl. No.: 72,733

[22] Filed: Jun. 7, 1993

[30] Foreign Application Priority Data

Jun. 16, 1992 [JP] Japan .................................. 4-181705

[51] Int. Cl.$^6$ .......................... G51B 15/14; G51B 15/12
[52] U.S. Cl. ................................. 360/64; 360/62
[58] Field of Search .................. 360/64, 46, 48, 360/52, 61, 62, 14.01, 14.02, 14.03; 358/311

[56] References Cited

U.S. PATENT DOCUMENTS

| | | | |
|---|---|---|---|
| 4,482,926 | 11/1984 | Nishijima et al. | 360/14.2 |
| 4,549,229 | 10/1985 | Nakano et al. | 360/64 X |
| 4,716,476 | 12/1987 | Okada et al. | 360/64 X |
| 4,761,693 | 8/1988 | Higashi et al. | 360/64 X |
| 4,802,038 | 1/1989 | Oguro | 360/64 X |
| 4,819,087 | 4/1989 | Takeuchi et al. | 360/14.3 |
| 4,901,166 | 2/1990 | Kojima | 360/14.1 |
| 5,018,036 | 5/1991 | Yamashita | 360/64 X |
| 5,155,636 | 10/1992 | Odaka | 360/38 |
| 5,182,677 | 1/1993 | Kizu et al. | 360/14.2 |
| 5,208,678 | 5/1993 | Nakagawa | 358/341 |

*Primary Examiner*—Donald Hajec
*Assistant Examiner*—Thien Minh Le
*Attorney, Agent, or Firm*—Robin, Blecker, Daley & Driscoll

[57] ABSTRACT

A recording and reproducing apparatus is arranged to reproduce an information signal from a recording medium on which the information signal is recorded, to detect a recorded position of the information signal on the recording medium and to form an after-recording signal on the basis of the result of detection of the recorded position, so that the after-recording signal can be recorded on the recording medium by after-recording without ruining the existing information signal already recorded on the recording medium.

30 Claims, 4 Drawing Sheets

ROTARY HEAD TYPE RECORDING AND REPRODUCING APPARATUS

BACKGROUND OF THE INVENTION

1. Field of the Invention

This invention relates to a rotary head type recording and reproducing apparatus arranged to be capable of after-recording (post-recording) new information on a recording medium on which a video signal, etc., has already been recorded.

2. Description of the Related Art

Some of known 8-mm type VTRs (video tape recorders) are arranged to be capable of after-recording new information, in addition to an existing record on a recording medium, at a guard band part between a video signal recording area and a PCM (pulse-code-modulated) audio signal recording area within an information recording track to be scanned by a rotary head.

FIG. 1 shows by way of example an information recording track formed on a recording medium by the VTR of the above-stated kind. Referring to FIG. 1, a magnetic tape 1 which is employed as the recording medium moves rightward at a given speed. Information tracks 2 are then formed one after another by means of a rotary head which is not shown. Each of the information tracks 2 is composed of a video signal recording area 3, a PCM audio signal recording area 4 and a new information recording area 5. These recording areas 3, 4 and 5 are independent of each other. Therefore, the recording track arrangement permits after-recording of information.

However, in after-recording new information alone on a magnetic tape which has the existing record of a video signal or a video signal and a PCM audio signal, the new information is controlled to be recorded in the new information recording area 5 which is fixedly set according to the recording format of the magnetic tape 1, irrespectively of the actual recorded positions of the video and PCM audio signals. Therefore, in a case where the recorded position of the video signal or the PCM audio signal happens to be deviating from the recording format, the after-recorded new information might reach the video signal recording area or the PCM audio signal recording area to ruin or destroy in part the existing record of the video or PCM audio signal.

SUMMARY OF THE INVENTION

This invention is directed to the solution of the above-stated problem of the prior art. It is, therefore, an object of the invention to provide a rotary head type recording and reproducing apparatus which is arranged to permit after-recording of new information without ruining the existing records.

Under this object, a recording and reproducing apparatus arranged according to this invention as an embodiment thereof comprises reproducing means for reproducing an information signal from a recording medium on which the information signal is recorded, and after-recording signal forming means including a detecting circuit arranged to detect a recorded position of the information signal on the recording medium on the basis of a predetermined signal included in the information signal reproduced by the reproducing means, the after-recording signal forming means being arranged to form an after-recording signal on the basis of a result of detection made by the detecting circuit.

It is another object of the invention to provide a rotary head type recording and reproducing apparatus which is arranged to be capable of controlling the formation of an after-recording signal by giving a warning when the recorded position of an existing video or PCM audio signal on a recording medium is deviating from a recording format.

Under that object, a recording and reproducing apparatus arranged according to this invention as another embodiment thereof comprises reproducing means for reproducing an information signal from a recording medium on which the information signal is recorded, after-recording signal forming means including a detecting circuit arranged to detect a recorded position of the information signal on the recording medium on the basis of a predetermined signal included in the information signal reproduced by the reproducing means, the after-recording signal forming means being arranged to form an after-recording signal on the basis of a result of detection made by the detecting circuit, and display means for displaying information related to the recorded position of the information signal on the recording medium on the basis of the result of detection made by the detecting circuit.

The above and other objects and features of the invention will become apparent from the following detailed description of embodiments thereof taken in connection with the accompanying drawings.

DETAILED DESCRIPTION OF THE PREFERRED EMBODIMENTS

Figure 2:
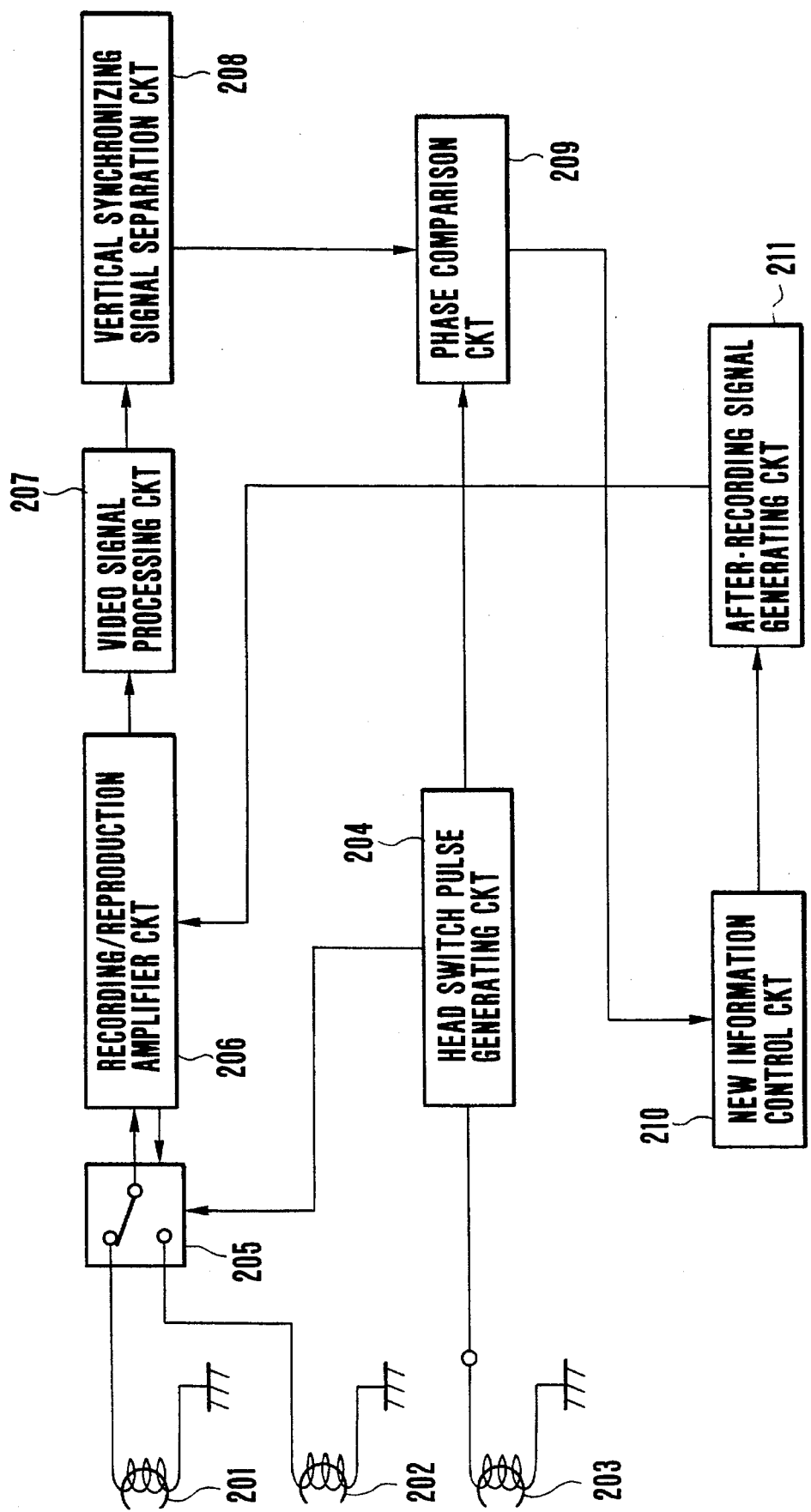
FIG. 2 is a block diagram showing by way of example the arrangement of a rotary head type recording and reproducing apparatus arranged according to this invention as a first embodiment thereof.

Some of the embodiments of this invention are described below with reference to the drawings:

FIG. 2 is a block diagram showing by way of example a rotary head type recording and reproducing apparatus which is arranged according to this invention as a first embodiment thereof. In the case of the first embodiment, this invention is applied to an 8-mm type VTR.

Figure 1:
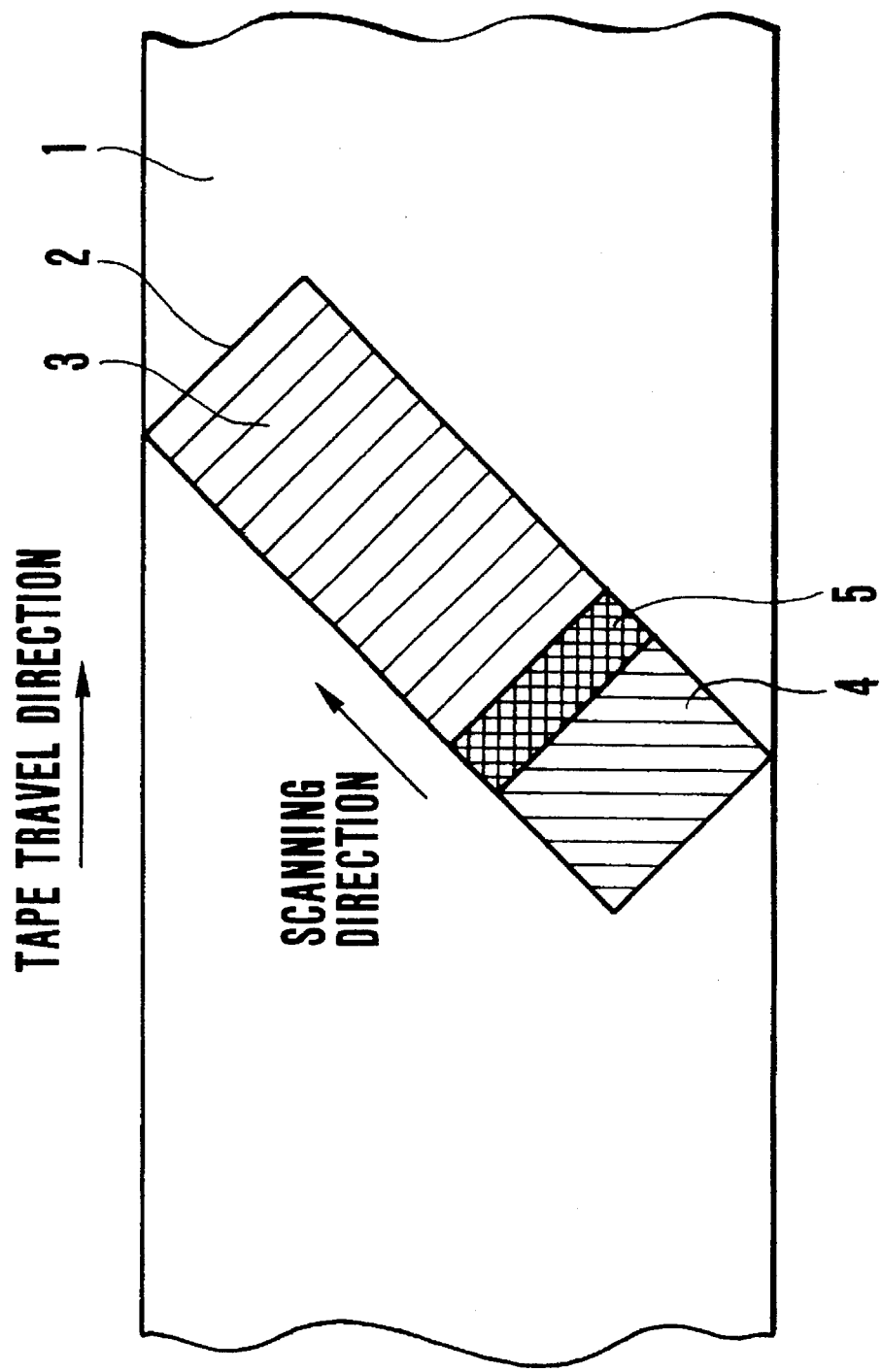
FIG. 1 shows an information recording track formed on a recording medium by an 8-mm type VTR.

The reproducing operation of the VTR is first described. Referring to FIG. 2, from a magnetic tape (not shown) on which information is recorded, in a manner as mentioned in the foregoing, an information signal is reproduced by a pair of rotary heads 201 and 202 which are disposed 180 degrees opposite to each other. The signals reproduced by these heads are supplied to a switch 205. A head 203 is a PG head which is provided for taking out a drum PG (phase generating) signal generated by a rotary drum (not shown) which has the rotary heads 201 and 202 mounted thereon. The PG signal from the PG head 203 is supplied to a head switch pulse generating circuit 204. The head switch pulse generating circuit 204 is arranged to form a head switching pulse (hereinafter referred to as pulse SWP) for switch-over of connection to the rotary head 201 or to the rotary head 202 according to the PG signal. The pulse SWP is supplied to the switch 205. In the 8-mm VTR, a video signal and a PCM audio signal for one field are arranged to be recorded in one track as shown in FIG. 1. Since one track is formed by one time of scanning of each head, two tracks are formed by one turn of the drum.

Upon receipt of the pulse SWP, the switch 205 changes its connecting position between the rotary heads 201 and 202. The switch 205 thus supplies the output signals of the rotary heads 201 and 202 to a recording/reproduction amplifier circuit 206, which is arranged to amplify the signals reproduced by the rotary heads 201 and 202. The reproduced signals thus amplified by the amplifier circuit 206 are supplied to a video signal processing circuit 207. A composite signal is formed by the video signal processing circuit 207. The composite signal is supplied to a vertical synchronizing (hereinafter referred to as sync) signal separation circuit 208. At the vertical sync signal separation circuit 208, a vertical sync signal is separated from the composite signal. Since a video signal for one field is recorded in one track, the vertical sync signal is included in each track.

To a phase comparison circuit 209 are supplied the pulse signal SWP from the head switch pulse generating circuit 204 and the vertical sync signal from the vertical sync signal separation circuit 208. The phase comparison circuit 209 compares the phases of these signals. The result of comparison is supplied to a new information control circuit 210. The new information control circuit 210 is provided for control over the generation of an after-recording signal.

In after-recording the new information, the VTR operates as described below with reference to FIGS. 3(a), 3(b) and 3(c). These drawings are timing charts showing the timing of the pulse signal SWP and that of the vertical sync signal supplied to the phase comparison circuit 209. Referring to these timing charts, a signal S1 shows the rise of the pulse signal SWP which is outputted from the head switch pulse generating circuit 204. A signal S2 shows the vertical sync signal outputted from the vertical sync signal separation circuit 208.

Figure 3A:
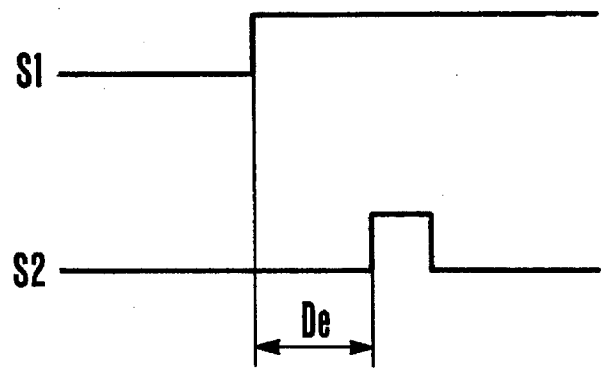
FIGS. 3(a), 3(b) and 3(c) are timing charts showing the timing of signals inputted to a phase comparison circuit of the apparatus shown in FIG. 1.
Figure 3B:
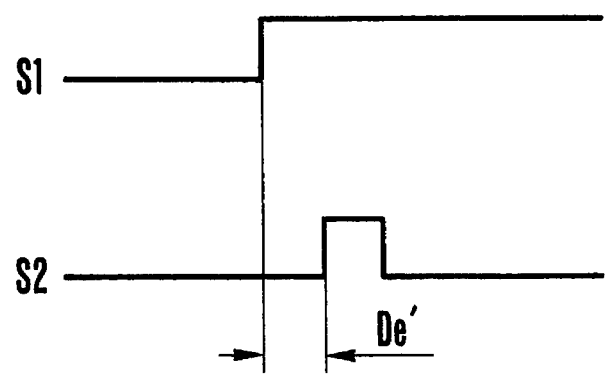
Figure 3C:
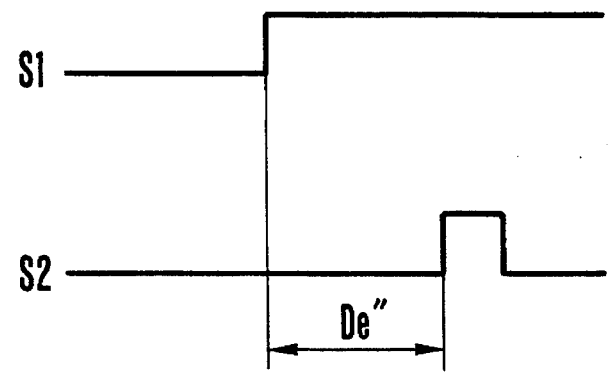

FIG. 3(a) represents a case where a video signal recorded in a certain track is in an ideal recording position on a (magnetic) recording tape. In this case, the difference in phase between the rise point of the SWP signal S1 and the reproduced vertical sync signal S2 is indicated by reference symbol De. FIG. 3(b) represents a case where the video signal is recorded in a position in advance of the ideal recording position on the recording tape. The phase difference obtained in that case is indicated by reference symbol De'. In the case of FIG. 3(c), the video signal is recorded in a position rearwardly of the ideal recording position on the recording tape, and the phase difference is indicated by reference symbol De". Further, for a track adjoining the above-stated track, the phase comparison circuit 209 compares the phase of a fall of the pulse signal SWP with the phase of the vertical sync signal.

Within the range of phase differences at which the existing records of the video and PCM audio signals will not be destroyed and ruined by the new information to be recorded by after-recording, the nondestructive limit on the advance side of phase is assumed to be De' and the nondestructive limit on the rearward side of phase to be De". Then, assuming that the phase difference outputted from the phase comparison circuit 209 is X, the range of allowable phase differences can be expressed as De'<X< De".

In cases where the result of phase comparison is within the range of De'<X<De", the new information control circuit 210 controls and causes an after-recording signal generating circuit 211 to supply an after-recording signal to the recording/reproduction amplifier circuit 206. In the event of De'≧X or De"≦X, the new information control circuit 210 controls the after-recording signal generating circuit 211 to prevent the after-recording signal from being outputted from the after-recording signal generating circuit 211.

In other words, in cases where the information recording track formed on the magnetic tape is not formed in conformity with a given format and after-recording the new information would ruin the existing record of information, the embodiment prevents the existing record of information from being ruined, by automatically stopping any after-recording signal from being generated.

The embodiment is arranged, as described above, to permit or inhibit the formation of after-recording signals according to the result of comparison made by the phase comparison circuit 209. However, this arrangement may be changed to control the timing of formation of the after-recording signal in such a way as to advance or delay the timing of after-recording signal recording as much as the extent to which the recorded position of the existing record as found by the phase difference is in advance of or rearwardly of the ideal recording position. This modification would enable the embodiment to record an after-recording signal without ruining the existing records of video and PCM audio signals even in a case where the phase difference is not within the allowable range.

Next, a second embodiment of this invention is described below with reference to FIG. 4. All the components of the second embodiment that are the same as or similar to those of the first embodiment are indicated by the same reference numerals in FIG. 4 and the details of them are omitted from the following description.

The second embodiment differs from the first embodiment in that a warning display control circuit 212, a display circuit 213 and a switch 214 used for the new information control circuit 210 are added to the arrangement of the first embodiment. Further, while, in the first embodiment, a vertical sync signal included in the video signal is extracted and compared with the pulse SWP to obtain a phase difference, a predetermined reference signal included in the video signal is compared with the pulse SWP to obtain a phase difference in the second embodiment.

Figure 4:
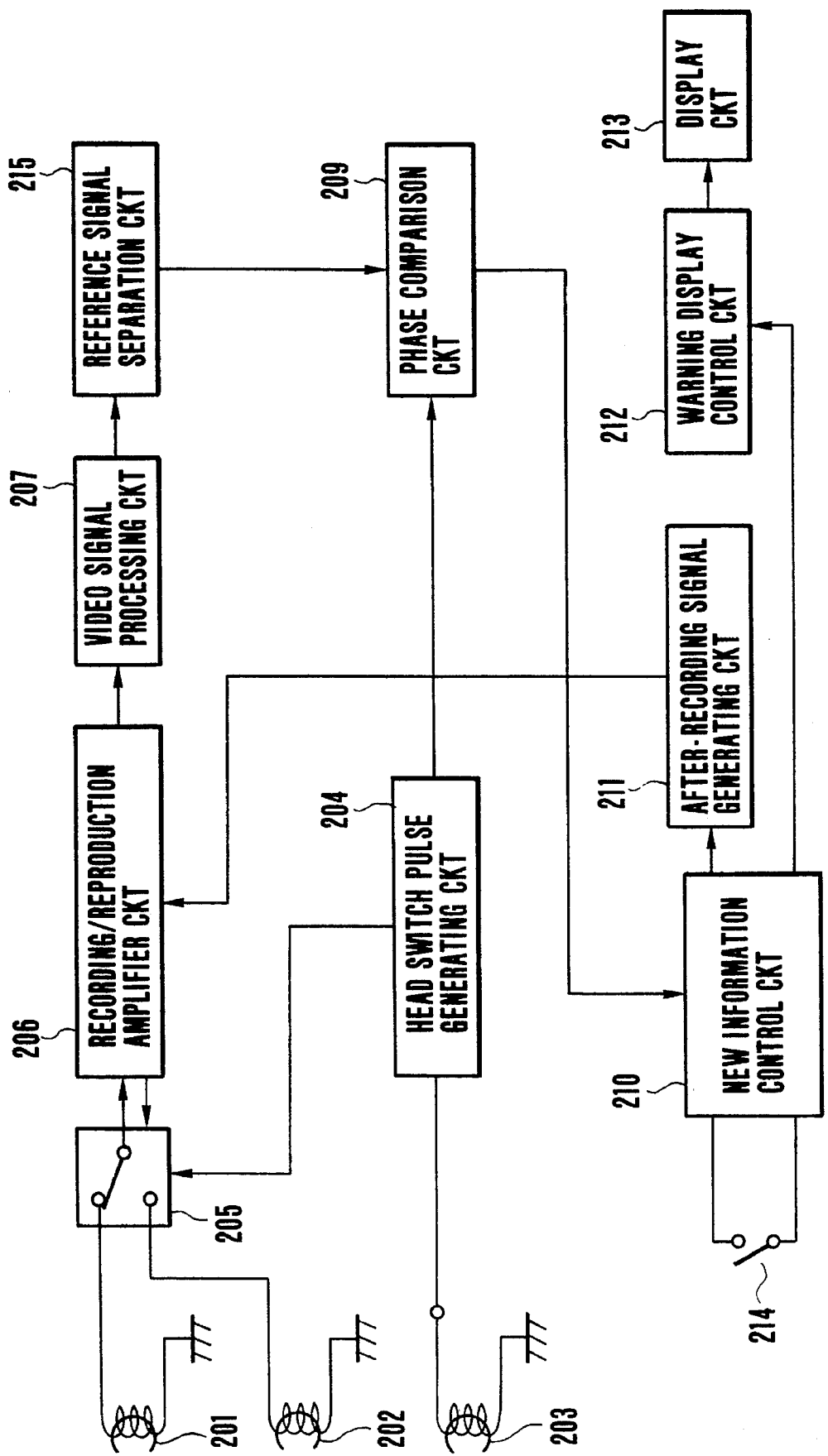
FIG. 4 is a block diagram showing by way of example the arrangement of a rotary head type recording and reproducing apparatus arranged according to this invention as a second embodiment thereof.

Referring to FIG. 4, in a case where the phase difference X is found to be not satisfying the condition of De'<X<De" through the comparison made by the phase comparison circuit 209, the new information control circuit 210 outputs a signal indicating that the existing record of a video signal or a PCM audio signal would be ruined by the after-recording of new information. This warning signal is supplied to the warning display control circuit 212. Upon receipt of this signal, the warning display control circuit 212 drives the display circuit 213 to display a warning message. The warning message enables the operator of the VTR to see the warning and to bring the after-recording to a stop by turning the switch 214 on as desired by the operator.

The second embodiment is thus arranged to give a warning display to enable the operator to control the after-recording as desired if there is any possibility of ruining the existing record of the video signal or the PCM audio signal by the after-recording. The arrangement thus eliminates the possibility of inadvertently ruining the existing record of a video or a PCM audio signal.

Like in the case of the first embodiment, the second embodiment also may be arranged to control the recording timing of the after-recording signal on the basis of the result of phase comparison. In addition to that, the display circuit 213 may be arranged to make a display indicating that the after-recording is allowable despite an inadequate phase difference. Such a display enables the operator to decide by means of the switch 214 to carry out or not to carry out the after-recording.

In accordance with this invention, as described above, new information can be recorded in addition to the existing record of information without ruining the existing record in after-recording the new information.

In the case of each embodiment described, the invention is applied to an 8-mm VTR. However, this invention is applicable to any other apparatus to attain the same advantageous effect as long as the apparatus is arranged to be capable of after-recording independently of the existing record of information.

Further, in a case where this invention is applied to a digital VTR arranged to record and/or reproduce video signals in a digital manner, a signal such as an ID signal is employed as a reference signal.

What is claimed is:

1. A reproducing apparatus comprising:
   a) reproducing means for reproducing an information signal from a recording medium on which the information signal is recorded, said reproducing means including a rotary head;
   b) after-recording signal forming means for forming an after-recording signal;
   c) detecting means for detecting a phase of said rotary head on the basis of a predetermined signal included in the information signal reproduced by said reproducing means; and
   d) control means for controlling an operation of said after-recording signal forming means on the basis of a result of detection made by said detecting means.

2. An apparatus according to claim 1, wherein said reproducing means includes at least a pair of rotary heads.

3. An apparatus according to claim 2, further comprising switch-over signal generating means for generating a switch-over signal for switching between said pair of rotary heads, and wherein said detecting means is arranged to detect said recorded position on the basis of said predetermined signal and said switch-over signal.

4. An apparatus according to claim 3, wherein said control means includes a phase-difference detecting circuit for detecting a difference in phase between said predetermined signal and said switch-over signal, said control means controlling the operation of said after-recording signal forming means such that said after-recording signal forming means forms the after-recording signal if the difference in phase between said predetermined signal and said switch-over signal is within a predetermined range and forms no after-recording signal if said difference in phase is not within said predetermined range.

5. An apparatus according to claim 1, further comprising display means for displaying information related to the result of detection made by said detecting means while said after-recording signal forming means is forming said after-recording signal.

6. An apparatus according to claim 1, further comprising manually operable means for manually controlling the operation of said after-recording signal forming means.

7. An apparatus according to claim 1, wherein said information signal is a video signal, and wherein said predetermined signal included in the information signal is a vertical synchronizing signal.

8. An apparatus according to claim 1, wherein said control means controls the operation of said after-recording signal forming means such that said after-recording signal forming means either forms the after-recording signal or stops forming the after-recording signal on the basis of the result of detection made by said detecting means.

9. An apparatus according to claim 1, wherein said control means controls the operation of said after-recording signal forming means such that said after-recording signal forming means varies timing of forming the after-recording signal on the basis of the result of detection made by said detecting means.

10. An apparatus according to claim 1, wherein said reproduction means reproduces the information signal from a track formed on the recording medium.

11. An apparatus according to claim 10, wherein the information signal includes an image signal and an audio signal which are recorded in different areas on the same track.

12. An apparatus according to claim 11, wherein the image signal and the audio signal are a digital signal.

13. An apparatus according to claim 1, further comprising manually operable means for manually controlling a forming operation of the after-recording signal forming means.

14. A reproducing apparatus comprising:
   a) reproducing means for reproducing an information signal from a recording medium on which the information signal is recorded, .said reproducing means including a rotary head;
   b) after-recording signal forming means for forming an after-recording signal;
   c) means for detecting a phase of said rotary head on the basis of a predetermined signal included in the information signal reproduced by said reproducing means; and
   d) display means for displaying information related to the result of detection made by said detecting means while said after-recording signal forming means is forming said after-recording signal.

15. An apparatus according to claim 14, wherein said reproducing means includes at least a pair of rotary heads.

16. An apparatus according to claim 15, further comprising switch-over signal generating means for generating a switch-over signal for switching between said pair of rotary heads, and wherein said detecting means includes a phase-difference detecting circuit for detecting a phase-difference between the predetermined signal and the switch-over signal.

17. An apparatus according to claim 14, wherein the reproduction means reproduces the information signal from a track formed on the recording medium.

18. An apparatus according to claim 17, wherein the information signal includes an image signal and an audio signal which are recorded in different areas on the same track.

19. An apparatus according to claim 18, wherein the image signal and the audio signal are a digital signal.

20. A recording and reproducing apparatus comprising:
   a) reproducing means for reproducing an information signal from a recording medium, said reproducing means including at least a pair of rotary heads;
   b) switch-over signal forming means for forming a switch-over signal for switching between said pair of rotary heads;

c) phase difference detecting means for detecting a difference in phase between said switch-over signal formed by said switch-over signal forming means and a predetermined signal included in the information signal reproduced by said reproducing means;

d) after-recording signal forming means for forming an after-recording signal;

e) control means for controlling an operation of said after-recording signal forming means on the basis of a result of detection made by said phase-difference detecting means; and f) recording means for recording the after-recording signal on the recording medium.

21. A reproducing apparatus, comprising:

a) reproducing means for reproducing an information signal;

b) after-recording signal forming means for forming an after-recording signal;

c) detecting means for detecting a reproduction timing of a reference signal included in the information signal reproduced by said reproducing means;

d) judgment means for judging whether or not a reproduction timing of the reference signal is within a predetermined range; and e) control means for controlling a forming operation of means for forming the after-recording signal.

22. An apparatus according to claim 21, wherein said reproducing means comprises at least a pair of rotary heads for reproducing the information signal from a recording medium on the information signal is recorded.

23. An apparatus according to claim 22, further comprising:

change-over signal forming means for forming a change-over signal for changing over the rotary head, wherein the judgment means judges whether or not difference in timing between the reproduction timing of the reference signal and a timing of outputting the change-over signal is within a predetermined range.

24. An apparatus according to claim 21, further comprising phase detection means for detecting a phase of the rotary head on the basis of detection results of the detection means, wherein the judgment means judges whether or not the phase of the rotary head is within a predetermined range.

25. An apparatus according to claim 21, further comprising generation means for generating a rotary signal relative to the rotating action of the rotary head.

26. An apparatus according to claim 25, wherein the judgment means includes a circuit for detecting difference in timing between a generation timing of the rotary signal and a reproduction timing of the reference signal, and the control means controls a forming operation of the after-recording signal forming means on the basis of the difference in timing.

27. An apparatus according to claim 21, wherein the reproduction means reproduces the information signal from a track formed on the recording medium.

28. An apparatus according to claim 27, wherein the information signal includes an image signal and an audio signal which are recorded in different areas on the same track.

29. An apparatus according to claim 28, wherein the image signal and the audio signal are a digital signal.

30. A reproducing apparatus, comprising:

(a) reproduction means for reproducing an information signal from a track formed on a recording medium, (b) after-recording signal forming means, (c) detection means for detecting a recording position of the information signal on the recording medium on the basis of a predetermined signal among information signals reproduced by the reproduction means, the information signal and the predetermined signal being recorded on the same track, and (d) control means for controlling a forming operation of the after-recording signal forming means on the basis of detection results of the detection means.

* * * * *